United States Patent
Leathers (10) Patent No.: US 6,972,089 B2
(45) Date of Patent: Dec. 6, 2005

(54) AIRCRAFT HYDRAULIC FLUID PURIFICATION SYSTEM AND METHOD

(75) Inventor: Thomas M. Leathers, Granger, IN (US)

(73) Assignee: Honeywell International, Inc., Morristown, NJ (US)

( * ) Notice: Subject to any disclaimer, the term of this patent is extended or adjusted under 35 U.S.C. 154(b) by 212 days.

(21) Appl. No.: 10/387,914

(22) Filed: Mar. 12, 2003

(65) Prior Publication Data

US 2003/0196956 A1    Oct. 23, 2003

Related U.S. Application Data

(60) Provisional application No. 60/364,318, filed on Mar. 13, 2002.

(51) Int. Cl.[7] .............................................. B01D 36/00
(52) U.S. Cl. ................. 210/195.1; 210/241; 210/257.1
(58) Field of Search ............................. 210/241, 195.1, 210/195.2, 196, 257.1, 257.2

(56) References Cited

U.S. PATENT DOCUMENTS

| 3,394,812 | A | * | 7/1968 | Cohen et al. ................ 210/134 |
| 4,328,098 | A | * | 5/1982 | Benson .................... 210/195.1 |
| 4,604,109 | A |   | 8/1986 | Koslow |
| 5,772,871 | A | * | 6/1998 | Lyon et al. .................. 210/168 |
| 5,858,070 | A | * | 1/1999 | Halm et al. ................... 95/248 |
| 5,951,857 | A | * | 9/1999 | Osborne ..................... 210/168 |
| 6,815,840 | B1 | * | 11/2004 | Aldendeshe ................ 290/1 R |

* cited by examiner

Primary Examiner—Terry K. Cecil
(74) Attorney, Agent, or Firm—Ingrassia Fisher & Lorenz (57) ABSTRACT

A system and method for storing and purifying used hydraulic fluid removed from an aircraft hydraulic fluid system includes a purification system that mounted on transportable cart. Used hydraulic fluid is transferred from an aircraft to a salvage tank that is mounted on the transportable cart. A hydraulic fluid purification module is also mounted on the transportable cart and is part of the purification system. The purification system may be fluidly coupled to an external system that supplies a motive source of flow energy, and may be selectively configured so that the used hydraulic fluid in the salvage tank passes through the purification module.

7 Claims, 6 Drawing Sheets

AIRCRAFT HYDRAULIC FLUID PURIFICATION SYSTEM AND METHOD

CROSS-REFERENCE TO RELATED APPLICATION

This application claims the benefit of U.S. Provisional Application No. 60/364,318 filed Mar. 13, 2002.

FIELD OF THE INVENTION

The present invention relates to a system and method for storing and purifying hydraulic fluid and, more particularly, to a system and method for storing and purifying the hydraulic fluid in one or more aircraft hydraulic fluid systems.

BACKGROUND OF THE INVENTION

Aircraft include various systems that are operated and controlled using hydraulic fluid. The hydraulic fluid used is generally a petroleum-based fluid, such as oil. When the hydraulic fluid is placed in the aircraft hydraulic systems, it is substantially free of water, solvents, particulate, and other unwanted contaminants. However, over time such contaminants can infiltrate the hydraulic system and contaminate the hydraulic fluid. If such contaminants are present in the hydraulic fluid, hydraulic system performance can be adversely affected and, in some instances, can result in corrosion of one or more hydraulic system components. Thus, the hydraulic fluid in aircraft hydraulic systems is periodically subjected to a purification process.

The hydraulic fluid in aircraft hydraulic systems is purified, in many instances, by connecting various pieces of portable equipment to the aircraft. For example, a portable vacuum purification unit and a ground cart that includes a hydraulic pump and various flow lines may be coupled to the aircraft hydraulic system. The hydraulic pump in the ground cart may be used to draw hydraulic fluid from the aircraft hydraulic system into the purification unit and then pump substantially purified hydraulic fluid from the purification unit back into the aircraft hydraulic system. In addition to these two pieces of equipment, a separate power generator may be required to power the purification unit and/or the hydraulic pump.

In many cases, the purification unit that is used is a vacuum type purification unit. Typically, this type of purification unit draws contaminated hydraulic fluid into a vacuum chamber. A spinning disk is mounted in the vacuum chamber, and hydraulic fluid that enters the vacuum chamber impinges on the center of the spinning disk. As the disk rotates, the hydraulic fluid is thrown off the disk and breaks into very small droplets yielding a large surface area. Ambient air is also drawn into and through the vacuum chamber. As the air enters the vacuum chamber it expands, resulting in a reduction in its relative humidity. Any water, air, or other solvents are carried from the vacuum chamber with the dehumidified airflow as exhaust. The dehydrated hydraulic fluid exits the vacuum chamber, via a discharge pump, and passes through a filter to remove any particulate.

Although the above-described equipment adequately purifies the hydraulic fluid in the aircraft hydraulic fluid system, it suffers certain drawbacks. For example, the flow rate through the purification unit may be relatively low (e.g., about 3 gallons per minute), and thus can be quite time-consuming. For some aircraft this can take up to twenty hours or more. Additionally, an operator is used to manipulate various hydraulic system controls to ensure the hydraulic fluid is circulated through the purifier and then into each system. Thus, a relatively high number of man-hours can be expended to purify all of the aircraft hydraulic fluid, which can increase overall costs.

Hence, there is a need for a system and method of purifying aircraft hydraulic system fluid that reduces the time needed to replace the hydraulic system with purified hydraulic fluid and/or reduces the amount of portable equipment used to perform this operation, and/or reduces the cost associated with this operation. The present invention addresses one or more of these needs.

SUMMARY OF THE INVENTION

The present invention provides a system and method for on-site replacement of the used hydraulic fluid in an aircraft hydraulic system with purified hydraulic fluid, and for on-site purification of the used hydraulic fluid. The on-site replacement and purification may be done in less time and/or at a relatively less cost as compared to presently used systems and methods.

In one embodiment, and by way of example only, a system for on-site storage and purification of used hydraulic fluid removed from an aircraft hydraulic fluid system includes a transportable cart, a salvage tank, first and second conduits, a hydraulic fluid purification module, and a valve system. The salvage tank is mounted on the transportable cart and has an inner volume dimensioned to contain at least the used hydraulic fluid. The first conduit has an inlet in fluid communication with the salvage tank inner volume and an outlet adapted to fluidly couple the salvage tank to an external system. The second conduit also has an inlet in fluid communication with the salvage tank inner volume and an outlet adapted to fluidly couple the salvage tank to an external system. The hydraulic fluid purification module is mounted on the transportable cart and is disposed in flow series communication between the inlet and the outlet of at least one of the first and second conduits. The valve system is mounted on the transportable cart and is fluidly coupled to the first and second conduits. The valve system is configured to at least selectively fluidly couple the first and second conduit inlets in flow series communication with their respective outlets, and the first and second conduit outlets and the purification module in a flow series circuit.

In another exemplary embodiment, a method of on-site purification of a volume of used hydraulic fluid removed from an aircraft hydraulic fluid system includes supplying a first transportable cart having a supply tank mounted thereon, and supplying a second transportable cart having a salvage tank mounted thereon. A volume of substantially purified hydraulic fluid is placed in the supply tank. A volume of the substantially purified hydraulic fluid is transfused into the aircraft hydraulic fluid system to thereby remove a substantially equivalent volume of used hydraulic fluid therefrom. The used hydraulic fluid removed from the hydraulic system is stored in the salvage tank and is then flowed through a purification module mounted on the second transportable cart to produce purified, used hydraulic fluid.

In yet another exemplary embodiment, a system for on-site replacement of used hydraulic fluid in an aircraft hydraulic fluid system with substantially purified hydraulically fluid and on-site purification of the replaced hydraulic fluid includes first and second transportable carts, a supply tank, a salvage tank, first, second, third, and fourth conduits, and a hydraulic fluid purification module. The supply tank is mounted on the first transportable cart and has an inner volume dimensioned to contain at least a volume of hydraulic fluid sufficient to replace the used hydraulic fluid. The first conduit has a first flow end in fluid communication with the supply tank inner volume and a second flow end adapted to fluidly couple the supply tank to an external system. The second conduit has a first flow end in fluid communication with the supply tank inner volume and a second flow end adapted to fluidly couple the salvage tank to an external system. The salvage tank is mounted on the second transportable cart and has an inner volume dimensioned to contain at least the used hydraulic fluid. The third conduit has a first flow end in fluid communication with the salvage tank inner volume and a second flow end adapted to fluidly couple the salvage tank to an external system. The fourth conduit has a first flow end in fluid communication with the salvage tank inner volume and a second flow end adapted to fluidly couple the salvage tank to an external system. The hydraulic fluid purification module is mounted on the second transportable cart and is disposed in flow series communication between the first flow end and the second flow end of at least one of the third and fourth conduits. The first valve system is mounted on the second transportable cart and is fluidly coupled to the third and fourth conduits. The first valve system is configured to at least selectively fluidly couple the third and fourth conduit first flow ends in flow series communication with their respective second flow ends, and the third and fourth conduit second flow ends and the purification module in a flow series circuit.

Other independent features and advantages of the preferred hydraulic fluid purification system and method will become apparent from the following detailed description, taken in conjunction with the accompanying drawings which illustrate, by way of example, the principles of the invention.

DETAILED DESCRIPTION OF A PREFERRED EMBODIMENT

Figure 1:
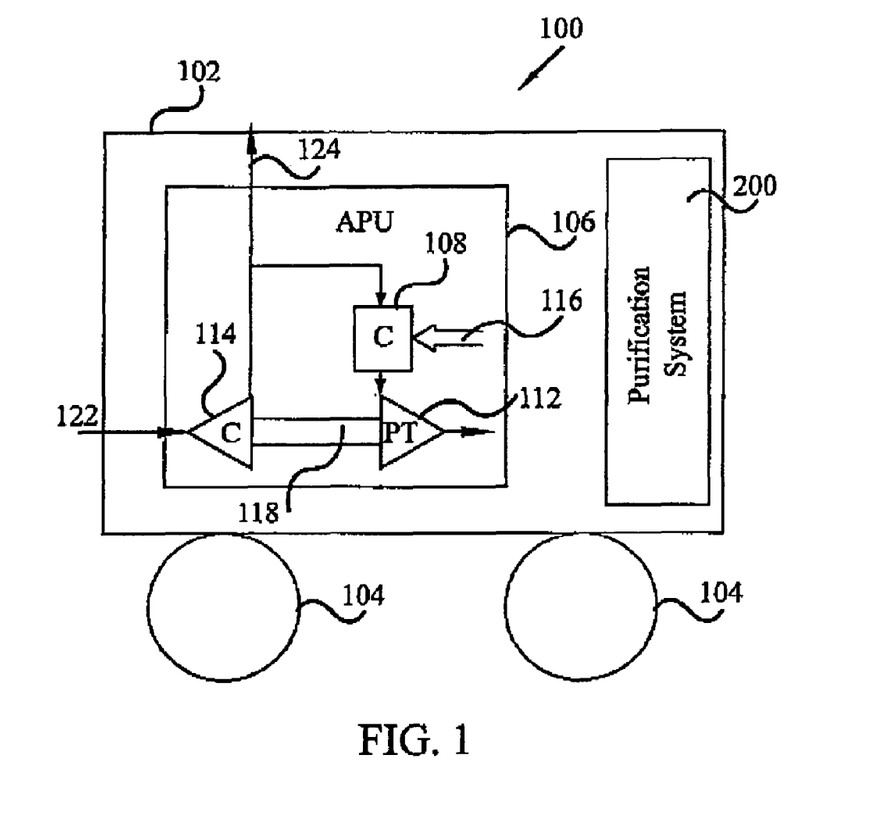
FIG. 1 is a simplified schematic representation of a transportable ground cart with a hydraulic fluid purification system mounted thereon.

A simplified schematic representation of a ground cart 100 with a hydraulic fluid purification system 200 mounted therein is depicted in FIG. 1. The ground cart 100 includes a housing 102 and varying numbers of rotationally mounted wheels 104, which allow the cart 100 to be readily transported to one or more aircraft. In addition to the hydraulic fluid purification system, various other systems and components may be mounted within the housing 102 to supply power and compressed air for various ground support operations. For example, in the depicted embodiment, an auxiliary power unit (APU) 106 is depicted. It should be appreciated that other systems and components may also be installed in the ground cart 100, but for the sake of clarity and ease of description, only a single APU is depicted.

The APU 106 includes a combustor 108, a power turbine 112, and a compressor 114. During APU operation, the combustor receives fuel 116 from a fuel source (not illustrated) and supplies high energy air to the power turbine 112 causing it to rotate. The power turbine 112 includes a shaft 118 that is used to drive the compressor 114. The compressor 114 draws in ambient air 122, compresses it, and supplies compressed air 124 to one or more additional systems. It should be appreciated that the presently described embodiment is not limited to use with a cart 100 that includes an APU, and that various other devices and systems such as, for example, a diesel engine, may also be used. Furthermore, it should be appreciated that the presently described embodiment is not limited to use with a cart 100 that includes an APU or diesel engine or various other systems and components not further described below.

Figure 2:
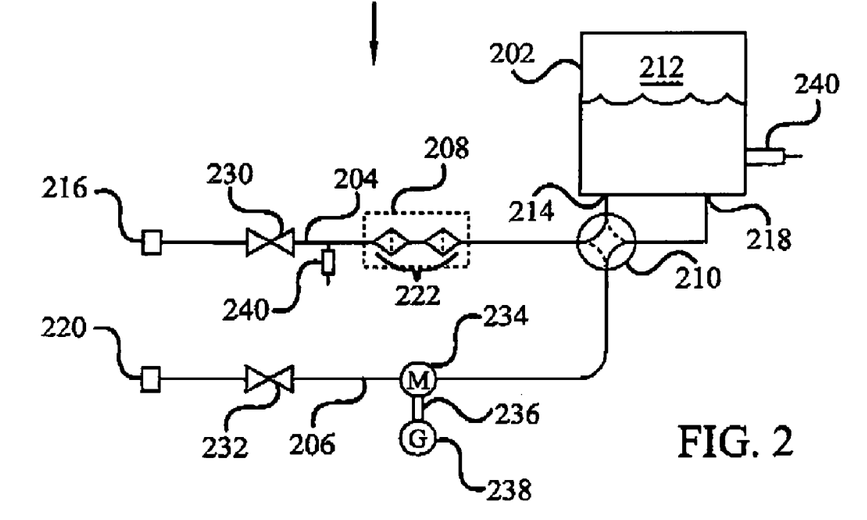
FIG. 2 is a simplified piping schematic representation of a hydraulic fluid purification system according to an exemplary embodiment of the present invention that may be included on the cart of FIG. 1.

The hydraulic fluid purification system 200, which is depicted more clearly in FIG. 2, includes a salvage tank 202, a first fluid conduit 204, a second fluid conduit 206, a purification module 208, and a valve system 210. The salvage tank 202 may be mounted on the cart in any one of numerous positions and configurations, and may be anyone of numerous sizes and shapes. For example, the salvage tank 202 may be a substantially closed, vented tank, or it may be an open tank. Preferably, the salvage tank 202 has an inner volume 212 that is at least sufficient to contain the entire volume of used hydraulic fluid that is being removed from a particular aircraft. In a particular preferred embodiment, the salvage tank inner volume is sufficient to contain the entire volume of hydraulic fluid in the hydraulic system of at least one aircraft.

The first fluid conduit 204 has a first flow end 214 and a second flow end 216. The first flow end 214 is in fluid communication with the salvage tank inner volume 212 and the second flow end 216 is adapted to couple to one or more external systems. Similarly, the second fluid conduit 206 has a first flow end 218 and a second flow end 220. As with the first conduit 204, the second conduit first flow end 218 is in fluid communication with the salvage tank inner volume 212 and the second conduit second flow end 220 is adapted to couple to one or more external systems. The external systems and manner of coupling the first and second conduit second flow ends 216 and 220 to these systems is described below. It will be appreciated that the first and second fluid conduit first flow ends 214 and 218 may extend partially into the salvage tank inner volume 212, or could be flush with a surface of the salvage tank 202. Additionally, one or more filters or strainers (not shown) may be configured on or in the first and second conduit first flow ends 214 and 218.

The purification module 208, in the depicted embodiment, is disposed in flow series communication between the first conduit first flow end 214 and second flow end 216. It will be appreciated that the purification module 208 could also be disposed in flow series communication between the second conduit first flow end 218 and second flow end 220. The purification module 208 may be any one of numerous types of devices useful for purifying hydraulic fluid. In a preferred embodiment, the purification module 208 includes one or more purification membranes 222 through which the hydraulic fluid flows to be purified. The purification membranes 222 separate moisture and other contaminants from the used hydraulic fluid. An example of one such purification module 208 is manufactured and sold by Porous Media Corporation.

Figure 3:
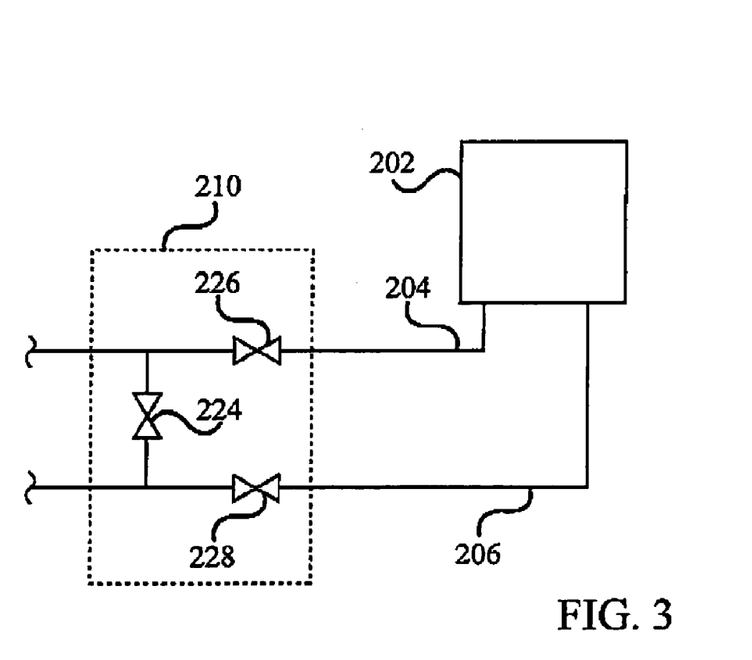
FIG. 3 is partial schematic representation of the hydraulic fluid purification system of FIG. 2 according to an exemplary alternative embodiment.

The valve system 210 is fluidly coupled to both the first 204 and second 206 conduits. In the depicted embodiment, the valve system 210 is a single four-way directional valve that may be selectively positioned to vary the flow configuration of the purification system 200. For example, in one position of the four-way valve, which is illustrated in FIG. 2, the system 200 is configured so that the first and second conduit first flow ends 214 and 218 are in flow series communication with their respective second flow ends 216 and 220. When the four-way valve is in another position, which is shown in phantom in FIG. 2, the system 200 is configured such that the first and second conduit second flow ends 216 and 220 and the purification module 208 form a flow series circuit that bypasses the salvage tank 202. In this latter position, the first and second conduit first flow ends 214 and 218 and the salvage tank 202 may also form a flow series circuit. It will be appreciated that, although a single four-way valve is preferable, the valve system 210 could also be made up of a plurality of valves disposed within the system 200 to provide various flow paths in and through the system 200. A non-limiting example of a multi-valve system 210 that includes three valves 224, 226, and 228 is shown in FIG. 3.

Returning now to FIG. 2, it is seen that the hydraulic fluid purification system 200, at least in the depicted embodiment, additionally includes two throttle valves. A first throttle valve 230 is mounted on the first conduit 204, and a second throttle valve 232 is mounted on the second conduit 206. The first 230 and second 232 throttle valves may be used to throttle hydraulic fluid flow in and through the purification system 200.

The system 200 may also include a hydraulic motor 234. In the depicted embodiment, the hydraulic motor 234 is disposed in flow series communication in the second conduit 206, though it will be appreciated that it could be so disposed in the first conduit 204 as well. The hydraulic motor 234 has a shaft 236 that rotates when fluid flows through it. It will be appreciated that the direction of shaft rotation will depend on the direction of fluid flow through the hydraulic motor 234. A generator 238 is coupled to the hydraulic motor shaft 236. Thus, when the shaft 236 rotates, the generator 238 generates electrical power. The generator 238 may be either a DC generator or an AC generator, and may be any one of numerous types of DC or AC generators. In a preferred embodiment, however, the generator 238 is an AC generator. It will be appreciated that electrical power could instead be provided by a battery.

The electrical power generated by the generator 238 may be supplied to systems and components external to the purification system 200, and is preferably used to supply electrical energy to various components within the system 200 such as, for example, moisture or other sensors. In particular, in the depicted embodiment, one or more water sensors 240 are coupled to sense the water content in the salvage tank 202. It will be appreciated that water sensors 240 could also be disposed in either, or both, the first 204 and second 206 conduits, to sense water content therein in addition to, or instead of, sensing it in the salvage tank.

Having described the overall structure of a particular preferred embodiment of the hydraulic fluid purification system 200, a particular preferred method of using the system 200 to purify used hydraulic fluid from an aircraft will now be described. In doing so, reference should be made to FIGS. 4–8, which depict various configurations of the system 200 for various operations being conducted.

Figure 4:
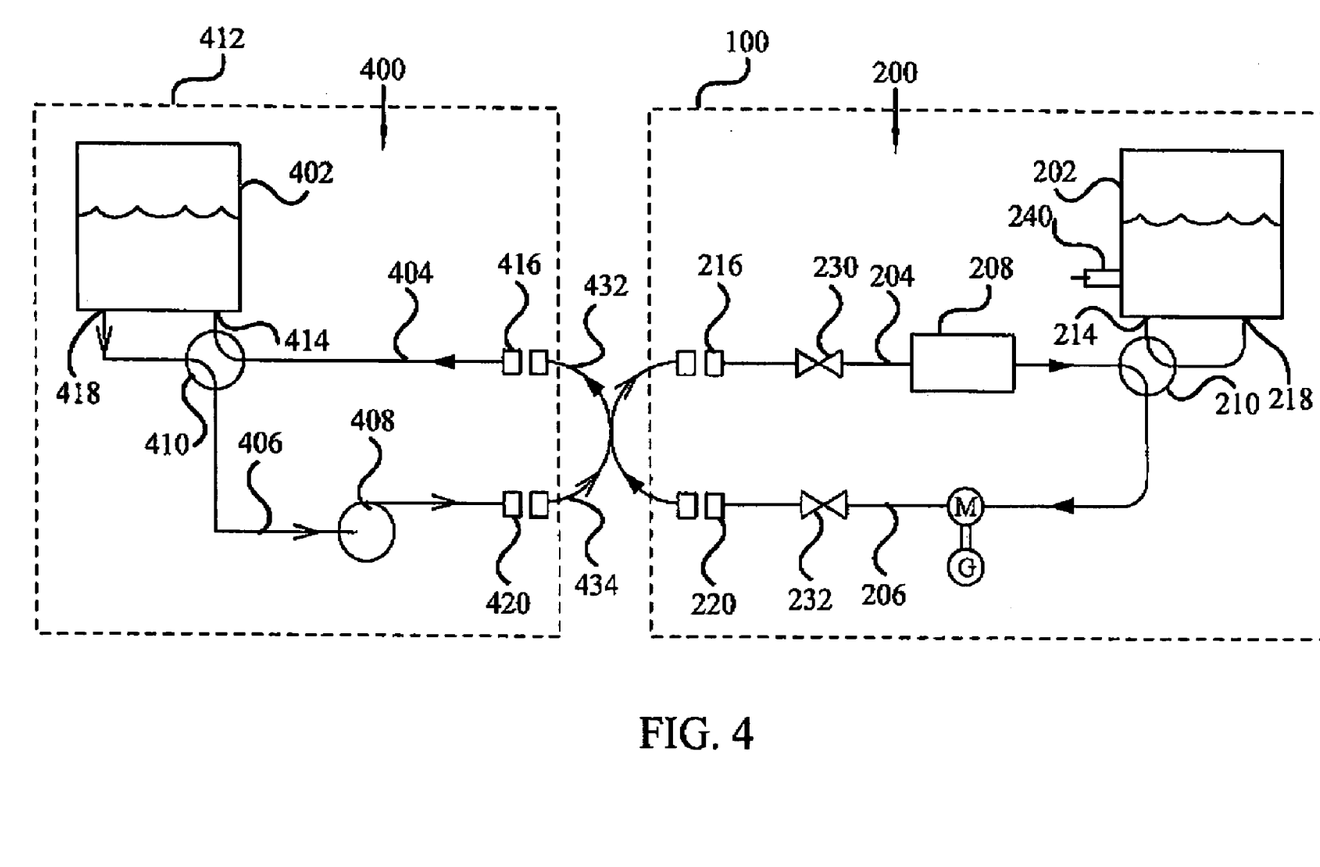
FIGS. 4–7 depict various configurations of the purification system of FIG. 2 and various connections of the purification system to external systems.

With reference first to FIG. 4, the hydraulic purification system 200 is shown fluidly coupled to a conventional hydraulic fluid supply cart 400. A supply cart 400 such as that shown in FIGS. 4–7 is, in some instances, referred to as a "hydraulic mule." The depicted hydraulic mule 400 includes a hydraulic fluid reservoir (or tank) 402, a first conduit 404, a second conduit 406, a hydraulic pump 408, and a four-way valve 410, all mounted on a transportable cart 412.

The operation depicted in FIG. 4 is the purification of the hydraulic fluid contained within the mule reservoir 402. For this operation, the purification system first conduit 204 is fluidly coupled to the mule second conduit 406, and the purification system second conduit 206 is fluidly coupled to the mule first conduit 404. To accomplish this, first and second interconnection conduits 432 and 434 such as, for example, suitably sized and constructed hoses, are coupled between the purification system first and second conduit second flow ends 216 and 220 and the hydraulic mule second and first conduit second flow ends 420 and 416, respectively. Additionally, the purification system four-way valve 210 is positioned such that the first and second conduit second flow ends 216 and 220 and the purification module 208 form a flow series circuit, and the hydraulic mule four-way valve 410 is positioned such that the hydraulic mule first and second conduit second flow ends 416 and 420 and the mule reservoir 402 form a flow series circuit.

In the above-described configuration, when the hydraulic pump 408 is turned on, the hydraulic fluid in the mule reservoir 402 is pumped through the mule second conduit 406, into and through the purification system first flow conduit 204 and purification module 208, into and through the purification system second conduit 206, and then back to the mule reservoir 402, via the mule first flow conduit 404. This operation is conducted until the hydraulic fluid that is in the mule reservoir is suitably purified. It is noted that this particular operation may be omitted if the hydraulic fluid in the mule reservoir 402 is suitably purified.

Figure 5:
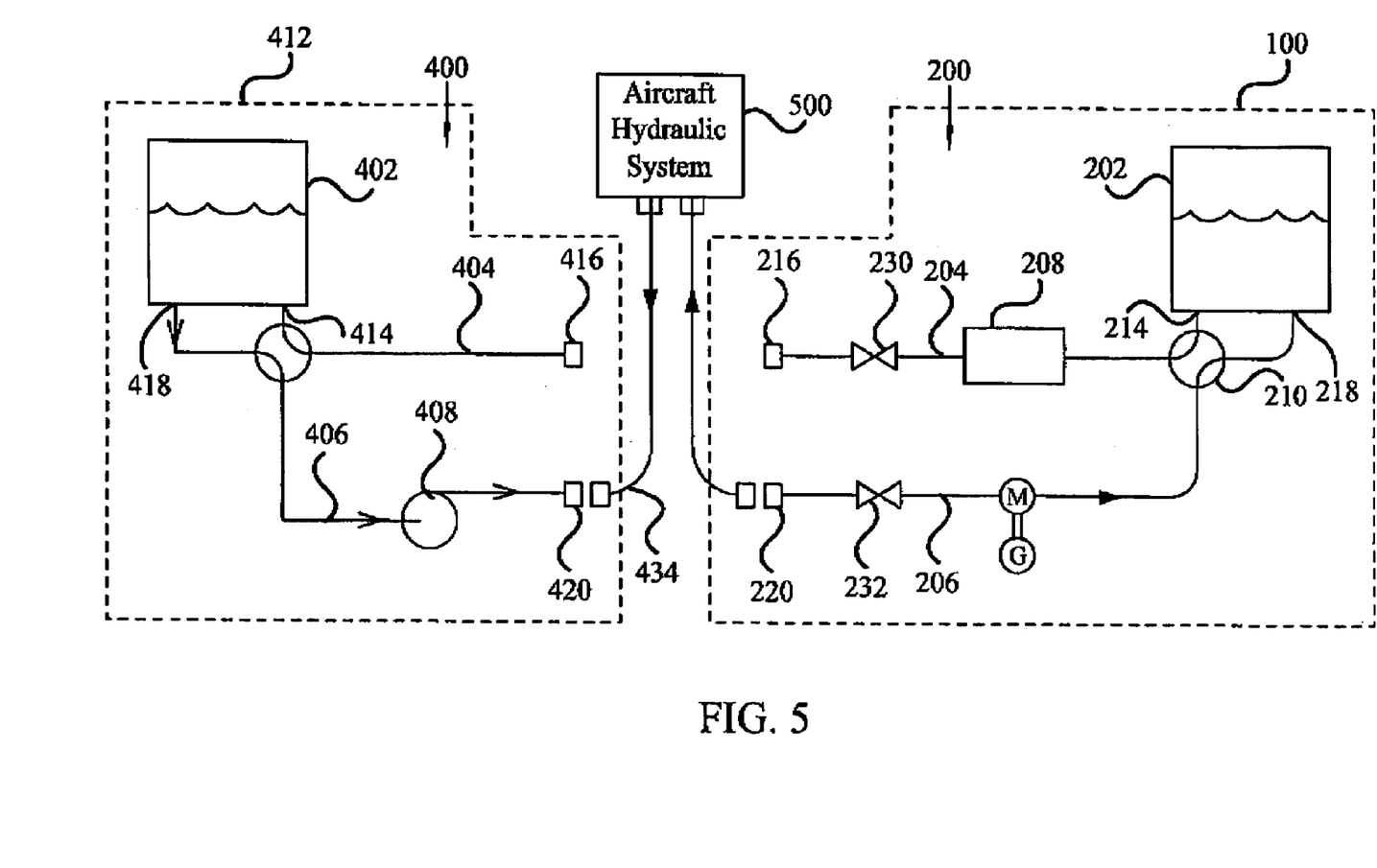

Turning now to FIG. 5, the purification system 200 and hydraulic mule 400 are shown fluidly coupled to an aircraft hydraulic system 500, and are configured to transfer the used hydraulic fluid from the aircraft hydraulic system 500 to the fluid purification system 200. For this operation, the purification system second conduit 206 and the hydraulic mule second conduit 406 are each fluidly coupled to the aircraft hydraulic system 500, via the first and second interconnection conduits 432 and 434. The purification system four-way valve 210 is positioned such that the first and second conduit second flow ends 216 and 220 and the salvage tank 202 form a flow series circuit, and the hydraulic mule four-way valve 410 is once again positioned so that the hydraulic mule first and second conduit second flow ends 416 and 420 and the mule reservoir 402 form a flow series circuit. The first throttle valve 230 is also placed in its fully closed position. Thus, the used hydraulic fluid that enters the salvage tank 202 does not flow into and through the purification system first conduit 204 and the purification module 208.

With the above-described configuration, when the hydraulic pump 408 is turned on, the substantially pure hydraulic fluid in the mule reservoir 402 will displace the used hydraulic fluid in the aircraft hydraulic system 500. The used hydraulic fluid that is displaced from the aircraft hydraulic system 500 flows into and through the purification system second conduit 206, and into the salvage tank 202.

Figure 6:
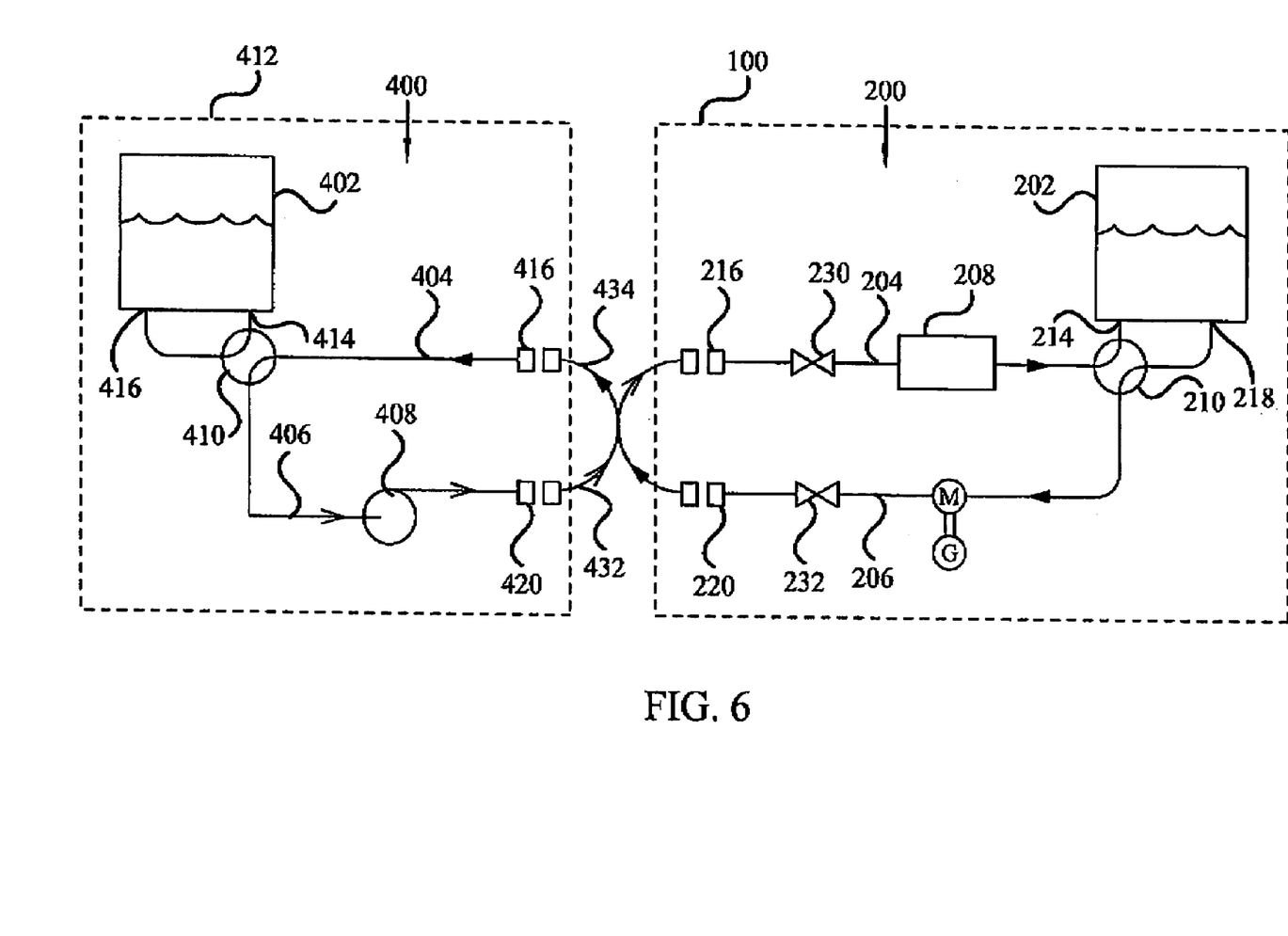

Once the used hydraulic fluid is transferred from the aircraft hydraulic system 500 to the fluid purification system 200, the used hydraulic fluid may then be purified. This particular operation is shown in FIG. 6. For this operation, the purification system first conduit 204 is fluidly coupled to the mule second conduit 406, and the purification system second conduit 206 is fluidly coupled to the mule first conduit 204, via the interconnection conduits 432 and 434, respectively. The purification system four-way valve 210 is positioned such that the first and second conduit second flow ends 216 and 220 and the salvage tank 202 form a flow series circuit, which includes the purification module 208. The hydraulic mule four-way valve 410 is positioned so that the hydraulic mule first and second conduit second flow ends 416 and 420 and the hydraulic pump 408 form a flow series circuit that bypasses the mule reservoir 402.

When the hydraulic pump 408 is turned on in the above-described configuration, the hydraulic pump 408 draws used hydraulic fluid from the salvage tank 202, into and through the purification system second conduit 206, into and through the second interconnection conduit 434, into and through the hydraulic mule first conduit 404, and into and through the hydraulic mule second conduit 406. The used hydraulic fluid then flows into and through the first interconnection conduit 432, into and through the purification system first conduit 204 and the purification module 208, and returns to the salvage tank 202. This operation continues until the used hydraulic fluid is substantially purified to a desired level.

Figure 7:
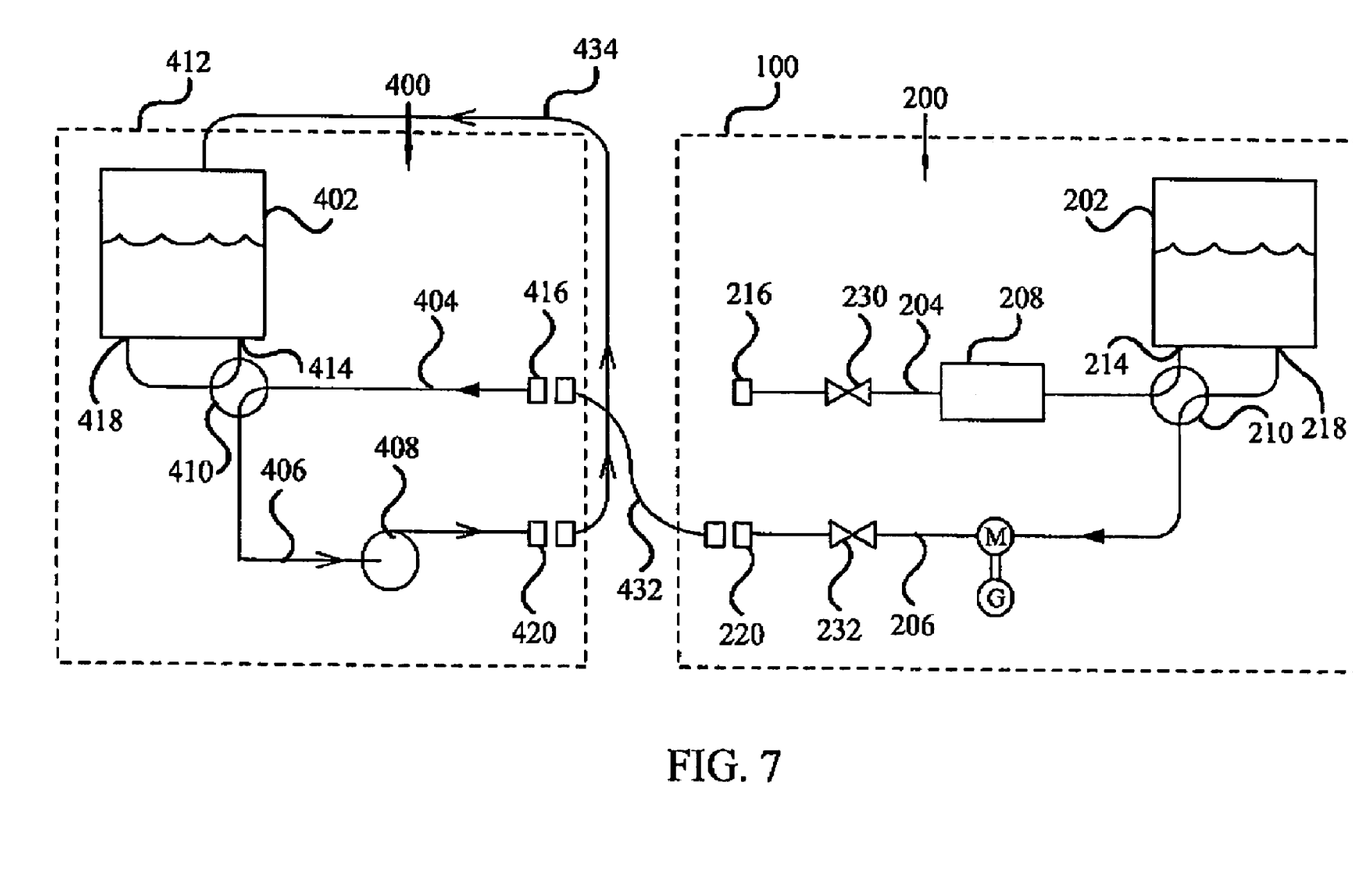

After the used hydraulic fluid has been substantially purified, it may then be transferred to the hydraulic mule 400 for later use in another aircraft hydraulic system 500. This operation is shown in FIG. 7. For this operation, the purification system second conduit 206 and the hydraulic mule first conduit 404 are fluidly coupled, via the first interconnection conduit 432, and the hydraulic mule second conduit 406 is fluidly coupled to the mule reservoir 402, via the second interconnection conduit 434. The purification system four-way valve 210 is positioned such that the purification system first and second conduit second flow ends 216 and 220 and the salvage tank 202 form a flow series circuit, and the first throttle valve 230 is placed in its fully closed position. The hydraulic mule four-way valve 410 is positioned so that the hydraulic mule first and second conduit second flow ends 416 and 420 and the hydraulic pump 408 form a flow series circuit that bypasses the mule reservoir 402.

With the above-described configuration, when the hydraulic pump 408 is turned on, it draws hydraulic fluid from the salvage tank 202, into and through the purification system second conduit 206, into and through the first interconnection conduit 432, into and through the hydraulic mule first conduit 404, and into and through the hydraulic mule second conduit 406. The used hydraulic fluid then flows into and through the second interconnection conduit 434, and into the hydraulic mule reservoir 402. This operation may continue until a suitable volume of purified hydraulic fluid is transferred to the hydraulic mule reservoir 402, or until the salvage tank 202 is empty.

The hydraulic fluid purification system and method described herein replaces the used hydraulic fluid in an aircraft hydraulic system with purified hydraulic fluid, and then purifies the used hydraulic fluid that is replaced. This operation is conducted in less time and/or at a relatively less cost as compared to presently used systems and methods.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A system configured for on-site replacement of used hydraulic fluid in an aircraft hydraulic fluid system with substantially purified hydraulical fluid and purifying the replaced hydraulic fluid, the system comprising:

a first transportable cart;

a supply tank mounted on the first transportable cart, the supply tank having an inner volume dimensioned to contain at least a volume of hydraulic fluid sufficient to replace the used hydraulic fluid;

a first conduit having a first flow end and second flow end, the first flow end in fluid communication with the supply tank inner volume and the second flow end adapted to fluidly couple the supply tank to an external system;

a second conduit having a first flow end and second flow end, the first flow end in fluid communication with the supply tank inner volume and the second flow end adapted to fluidly couple the salvage tank to an external system;

a second transportable cart;

a salvage tank mounted on the second transportable cart, the salvage tank having an inner volume dimensioned to contain at least the used hydraulic fluid;

a third conduit having a first flow end and second flow end, the first flow end in fluid communication with the salvage tank inner volume and the second flow end adapted to fluidly couple the salvage tank to an external system;

a fourth conduit having a first flow end and second flow end, the first flow end in fluid communication with the salvage tank inner volume and the second flow end adapted to fluidly couple the salvage tank to an external system;

a hydraulic fluid purification module mounted on the second transportable cart and disposed in flow series communication between the first flow end and the second flow end of at least one of the third and fourth conduits;

a first valve system mounted on the second transportable cart and fluidly coupled to the third and fourth conduits, the first valve system configured to at least selectively fluidly couple (i) the third and fourth conduit first flow ends in flow series communication with their respective second flow ends and (ii) the third and fourth conduit second flow ends and the purification module in a flow series circuit;

a second valve system mounted on the first transportable cart and fluidly coupled to the first and second conduits, the second valve system configured to at least selectively fluidly couple (i) the first and second conduit first flow ends in flow series communication with their respective second flow ends and (ii) the first and second conduit second flow ends and the hydraulic pump in a flow series circuit;

a hydraulic motor having an output shaft and disposed in flow series communication between the first flow end and the second flow end of one of the third and fourth conduits, the hydraulic motor operable to rotate the output shaft in response to hydraulic fluid flow therethrough;

first and second interconnection conduits adapted to connect to said first, second, third, and fourth conduit second ends to form a fluid circuit between said carts; and an electrical generator coupled to the motor output shaft and operable to generate electrical power in response to motor output shaft rotation.

2. The system of claim 1, further comprising:

a hydraulic pump having a fluid inlet and a fluid outlet and mounted on the first conduit such that the fluid inlet is fluidly downstream of the supply tank, whereby the hydraulic pump may draw fluid from the supply tank inner volume.

3. The system of claim 1, wherein the first and second valve systems each comprise a single valve having multiple flow configurations.

4. The system of claim 1, wherein the first and second valve systems each comprise a plurality of valves.

5. The system of claim 1, further comprising:

a first throttle valve mounted on the third conduit proximate its second flow end and selectively movable between an open and a closed position; and a second throttle valve mounted on the fourth conduit proximate its second flow end and selectively movable between an open and a closed position.

6. The system of claim 1, wherein the purification unit comprises one or more membranes.

7. The system of claim 1, wherein the first, second, third, and fourth conduit second ends are each adapted to selectively couple to one another via said interconnection conduits, wherein said interconnection conduits are flexible conduits.

* * * * *